United States Patent [19]

Shibata et al.

[11] Patent Number: 4,852,148
[45] Date of Patent: Jul. 25, 1989

[54] RADIO TELEPHONE SYSTEM

[75] Inventors: Toshihiko Shibata; Mitsuo Sato; Yoshitoshi Murata, all of Yokohama; Noriaki Nagashima, Kawasaki, all of Japan

[73] Assignees: Matsushita Communication Industrial Co., Ltd., Yokohama; Nippon Telegraph and Telephone Corporation; NEC Corporation, both of Tokyo, all of Japan

[21] Appl. No.: 206,673

[22] Filed: Jun. 15, 1988

[30] Foreign Application Priority Data

Jun. 19, 1987 [JP] Japan .................................. 62-153711

[51] Int. Cl.$^4$ ................................................ H04Q 7/01
[52] U.S. Cl. ......................................... 379/59; 379/61; 455/127; 455/343
[58] Field of Search ....................... 379/56, 58, 61, 62, 379/63, 59; 455/127, 343

[56] References Cited

U.S. PATENT DOCUMENTS

| | | | |
|---|---|---|---|
| 3,962,553 | 6/1976 | Linder | 379/61 |
| 4,562,307 | 12/1985 | Bursztejn et al. | 455/343 |
| 4,591,914 | 5/1986 | Hakamada et al. | 358/190 |
| 4,598,258 | 7/1986 | Bagano | 331/14 |
| 4,600,948 | 7/1986 | Dangschat | 358/190 |
| 4,646,345 | 2/1987 | Zounek et al. | 379/62 |
| 4,647,722 | 3/1987 | Nishida et al. | 379/63 |
| 4,658,416 | 4/1987 | Tanaka | 379/57 |
| 4,680,785 | 7/1987 | Akiyama et al. | 379/57 |
| 4,698,748 | 10/1987 | Juzswik et al. | 364/200 |
| 4,723,264 | 2/1988 | Sasuta et al. | 379/58 |
| 4,723,304 | 2/1988 | Maeda | 458/69 |
| 4,731,814 | 3/1988 | Becker et al. | 379/62 |
| 4,733,100 | 3/1988 | Nasairat et al. | 307/9 |
| 4,736,410 | 4/1988 | Nishida | 379/354 |
| 4,736,461 | 4/1988 | Kawasaki et al. | 455/343 |
| 4,740,788 | 4/1988 | Konneker | 340/825.44 |
| 4,748,655 | 5/1988 | Thrower | 379/60 |

Primary Examiner—Robert Lev
Attorney, Agent, or Firm—Stevens, Davis, Miller & Mosher

[57] ABSTRACT

A radio telephone system has a radio telephone set which has a receiving circuit the power of which is turned on or off in predetermined cycles, a radio connector transmit an ID number of the radio zone where it exists for a longer period than the period of turning on or off the power supply of the receiving circuit of the radio telephone set in predetermined cycles, the radio telephone set compares the ID number of the radio zone received with that stored in a memory, and when the ID numbers fail to coincide with each other, the ID number of the radio telephone set and the ID number of the radio zone received are transmitted as a position entry signal to a radio channel control unit through the radio connector, and the radio channel control unit being adapted to register the ID number of the radio telephone set and that of the radio zone.

7 Claims, 8 Drawing Sheets

FIG. 3A
SYSTEM FILE

| ID OF RADIO CHANNEL CONTROL UNIT | : SYSTEM ID NUMBER (SYS-ID) |
| --- | --- |
| SYSTEM CAPACITY | : NUMBER OF SUBSCRIBERS |
| NUMBER OF RADIO ZONE | : NUMBER OF CONTROL STATIONS |
| NUMBER OF RADIO CONNECTORS | : NUMBER OF ALL SYSTEMS |
| OFFICE DATA OF RADIO CONNECTOR | MONITOR TIMER VALUE, ETC. |

FIG. 3B
SUBSCRIBER FILE

| SUBSCRIBER NUMBER | : SUBSCRIBER CALL NUMBER |
| --- | --- |
| ID OF RADIO TELEPHONE | : ID NUMBER OF RADIO TELEPHONE (RTEL-ID) |
| POSITION DATA | : DATA AT TIME OF POSITION ENTRY |
| SUBSCRIBER CLASS | : SUBSCRIBER CLASS (GENERAL/VIP,ETC.) |

PROVIDED AS MANY AS SUBSCRIBERS

FIG. 3C
OFFICE DATA FILE

| LINE NUMBER | : RADIO CHANNEL NUMBER |
| --- | --- |
|  |  |
|  |  |
| LINE STATUS | : LINE PACKAGE STATUS (PACKAGED / NON-PACKAGED, CLOSED) |

PROVIDED AS MANY AS TRUNKS AND RADIO CHANNELS

FIG. 3D

LINE CONNECTION FILE

| SUBSCRIBER NUMBER | : SUBSCRIBER CALL NUMBER |
| OFFICE SIDE LINE NUMBER | : OFFICE SIDE LINE NUMBER |
| RADIO SIDE LINE NUMBER | : LINE NUMBER FOR RADIO CONNECTOR |
| STATUS | : STATUS OF IN-OUT ID |
| CONNECTION TIME | : AREA FOR STORING LINE CONNECTION TIME |

FILE FOR STORING THAT SUBSCRIBERS ARE UNDER LINE CONNECTION BY INCOMING AND OUT GOING CALLS,

AND USED FOR SPEECH RECORD, ETC.

FIG. 3E

RADIO AREA FILE

| RADIO ZONE NUMBER | : RADIO ZONE NUMBER |
| NUMBER OF RADIO CONNECTORS | : NUMBER OF RADIO CONNECTORS IN A ZONE |
| RADIO CONNECTOR NUMBER #1 | : RADIO CONNECTOR NUMBER #1 IN A ZONE AT THE TIME |
| ⋮ | |
| #n | |

PROVIDED AS MANY AS RADIO ZONES

FIG. 4A

RADIO CHANNEL CONNECTION FILE

| CONNECTION STATUS | : STATUS OF OPERATION OF RADIO CONNECTOR |
|---|---|
| RTEL-ID UNDER CONNECTION | : NUMBER OF RADIO TELEPHONE IN CONNECTION |
| CONNECTION SEQUENCE DATA | : CONTROL SEQUENCE FOR OUTGOING AND INCOMING CALL PROCESSING |
| RADIO SIDE CONTROL SIGNAL | : CONTROL SIGNAL BETWEEN RADIO CONNECTOR AND RADIO TELEPHONE |
| WIRE SIDE CONTROL SIGNAL | : CONTROL SIGNAL BETWEEN RADIO CONNECTOR AND RADIO CHANNEL CONTROL UNIT |

FIG. 4B

OFFICE DATA FILE

| ID OF HOME RADIO CHANNEL CONTROL UNIT | : SYS-ID |
|---|---|
| RADIO ZONE NUMBER | : POSITION DATA |
| RADIO CONNECTOR NUMBER | : ID NUMBER OF RADIO CONNECTOR |
| VACANT Sch SEARCH CYCLE | : CYCLE OF SEARCHING FOR VACANT Sch |
| DIAL PAUSE | |
| PULSE SPEED | |
| MAKE RATE | |

FIG. 5A
RADIO CHANNEL CONNECTION FILE

| CONNECTION STATUS | : CONNECTION STATUS OF RADIO TELEPHONE |
| --- | --- |
| RADIO CONNECTOR NUMBER IN CONNECTION | : RADIO CONNECTOR NUMBER CONNECTED |
| SYS-ID IN CONNECTION | : SYSTEM NUMBER OF RADIO CHANNEL CONTROL UNIT FOR SYSTEM CONNECTED |
| CONNECTION SEQUENCE DATA | : CONTROL SEQUENCE BETWEEN RADIO NUMBER AND RADIO TELEPHONE |
| RADIO-SIDE CONTROL NUMBER | : CONTROL SIGNAL BETWEEN RADIO CONNECTOR AND RADIO TELEPHONE |

FIG. 5B
RADIO TELEPHONE ID FILE

| RADIO TELEPHONE NUMBER | : RTEL-ID |
| --- | --- |

FIG. 5C
RADIO ZONE NUMBER FILE

| RADIO ZONE No. | : RADIO ZONE POSITION DATA |
| --- | --- |

FIG. 5D
ABB DIAL FILE

| ABB DIAL No. | : ABB DIAL CODE NUMBER 0 TO 9 |
| --- | --- |
| DIAL CODE | : FIRST DIGIT OF DIAL CODE |
| ⋮ | ⋮ |
| | n-TH DIGIT OF DIAL CODE |
| END DELIMITER | |

FIG. 5E
REDIAL FILE

| DIAL CODE MEMORY | : DIAL CODE DIALED IMMEDIATERY BEFORE |
| --- | --- |

F I G. 7

RADIO TELEPHONE SYSTEM

BACKGROUND OF THE INVENTION

The present invention relates to a radio telephone system used for a cordless telephone, an automobile telephone or the like.

DESCRIPTION OF THE PRIOR ART

A radio telephone system is well known, comprising a plurality of radio telephone sets (RTEL) such as cordless telephone sets or automobile telephone sets making up mobile stations, a plurality of radio connectors (CE) arranged in a plurality of radio zones respectively for radio communication with the radio telephone sets, a radio channel control unit (RCU) for communicating with the radio connectors (CE) and a private branch exchange (PBX), an office exchange or the like exchange connector connected with the radio channel control unit (RCU) thereby to establish communications between different radio telephone sets (RTEL) or through a trunk line of the radio telephone sets (RTEL).

The radio channel control unit (RCU) and the radio connector (CE) mentioned above are similar to the system control station and a base station of each radio zone in the automobile telephone system, respectively.

In this radio telephone system with the radio telephone sets (RTEL) making up mobile stations, it is necessary that the radio zone where a radio telephone set (RTEL) is located is registered or entered in the radio channel control unit (RCU) before forming a communication path of the radio telephone set (RTEL).

In conventional radio telephone systems of this kind, the position data indicating each radio zone is constantly announced by the radio connector (CE) providing a stationary station in order to register the radio zone covering a radio telephone set (RTEL), so that each radio telephone set (RTEL) constantly monitors the present radio zone by this position data. When moving between radio zones, the radio telephone set thus sends out a position entry demand signal and an ID number automatically thereby to register the position data of each radio telephone set (RTEL) with the radio channel control unit (RCU).

The conventional radio telephone system described above, however, is required to keep on the power supply of the radio telephone sets (RTEL) making up mobile stations in order to keep monitoring the position data from the radio connectors, thereby posing the problem of power consumption by the radio telephone sets (RTEL).

SUMMARY OF THE INVENTION

Accordingly, the object of the present invention is to provide a radio telephone system capable of registering the position of a radio telephone set automatically while reducing power consumption thereof.

In order to solve the above-mentioned problem, there is provided according to the present invention a radio telephone system in which each radio telephone set has a receiving circuit the power of which is turned on or off in predetermined cycles, each radio connector transmits an ID number of the radio zone for a longer period than the period of turning on or off of the power supply of the receiving circuit of the radio telephone set in predetermined cycles, the radio telephone set comparing the ID number of the radio zone received when the power supply of the receiving circuit is on with that stored in a memory, and when the ID numbers fail to coincide with each other a predetermined number of times (say, twice) successively, the ID number of the radio telephone set and the ID number of the radio zone received are transmitted as a position entry signal to the radio channel control unit through the radio connector at a timing formed on the basis of the ID number of the radio telephone set, the radio channel control unit being adapted to register the ID number of the radio telephone set and that of the radio zone.

According to the present invention, the position of each radio telephone set is capable of being registered without keeping on the power supply of the receiving circuit of the radio telephone set, thereby reducing the power consumption of the radio telephone set.

DESCRIPTION OF THE PREFERRED EMBODIMENT

An embodiment of the present invention will be explained below with reference to the accompanying drawings.

Figure 1:
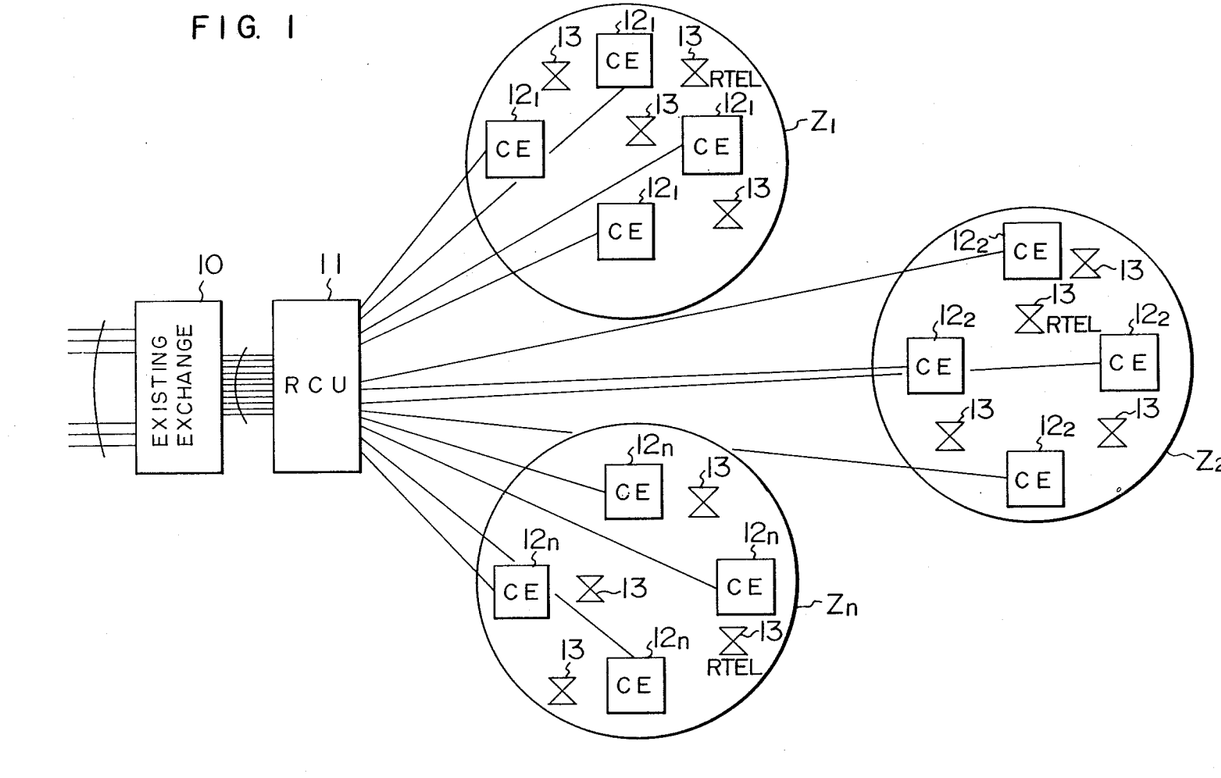
FIG. 1 is a diagram showing a general configuration of a radio telephone system embodying the present invention.

In FIG. 1, reference numeral 11 designates a stationary station connected to an existing telephone exchange 10, which makes up a radio channel control unit (RCU) for controlling the radio telephone system as a whole. Numerals $12_1$ to $12_n$ designate stationary stations providing small-power radio connectors (CE) with a communication radius of about 30 to 100 m, each of the radio connectors $12_1$ to $12_n$ including a plurality of units. Each of the radio connectors $12_1$ to $12_n$ makes up each corresponding one of radio zones $Z_1$ to $Z_n$ to establish radio communication with a radio telephone set (RTEL) located in a corresponding radio zone.

Each of the radio zones $Z_1$ to $Z_n$ makes up a radio service area under the control of the radio channel control unit 11. An operator carrying a radio telephone set 13 (in the case of cordless telephone), when located within this service area, is capable of establishing communication with other radio telephone sets 13 or through the trunk line by way of the radio channel control unit 11 and the radio connectors $12_1$ to $12_n$.

The radio channel control unit 11 is connected to the existing telephone exchange 10 through as many telephone lines as the radio telephone sets 13. The radio connectors $12_1$, $12_2$ to $12_n$ are arranged in the radio zones $Z_1$, $Z_2$ to $Z_n$ respectively at the rate of one for each several radio telephone sets 13 in accordance with the busy-hour traffic and loss probability.

Figure 2:
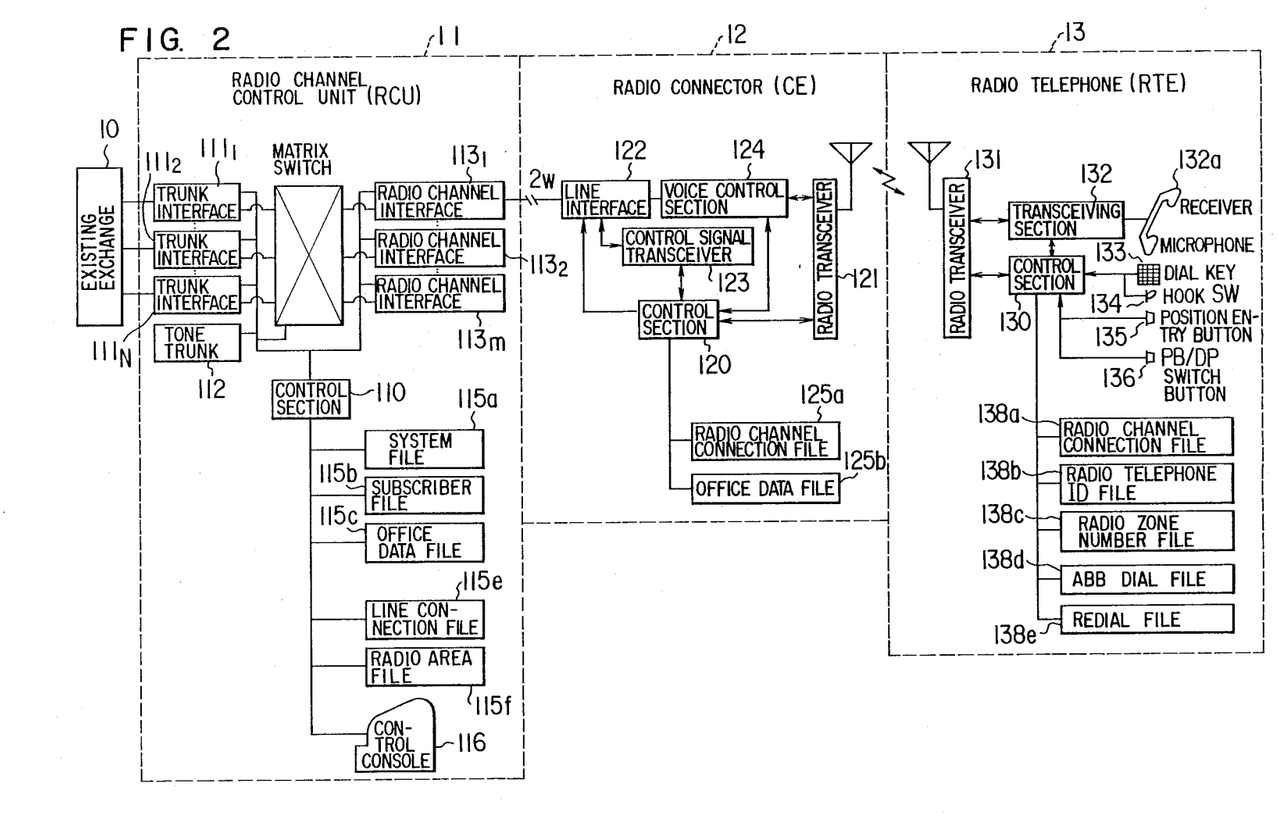
FIG. 2 is a block diagram showing each device of the radio telephone system of FIG. 1 in detail.

Now, a detailed configuration of the radio channel control unit 11, the radio connectors 12 and the radio telephone sets 13 will be explained with reference to FIG. 2.

In the radio channel control unit 11, numeral 110 designates a control section for controlling the radio channel control unit 11 as a whole. The control section 110 includes a microcomputer (CPU), a ROM (read-only memory) for storing an execution program for the CPU, and a RAM(random access memory) having a working area for the CPU, etc.

Numerals $111_1$ to $111_N$ designate trunk interfaces connected with telephone lines respectively, numeral 112 a tone trunk for generating various tone signals, numeral $113_1$ to $113_m$ radio channel interfaces connected to the radio connectors $12_1$ to $12_n$ respectively, and numeral 114 a matrix switch for connecting the trunk interfaces $111_1$ to $111_N$, the tone trunk 112 and the radio channel interfaces $113_1$ to $113_m$.

Figure 3A:
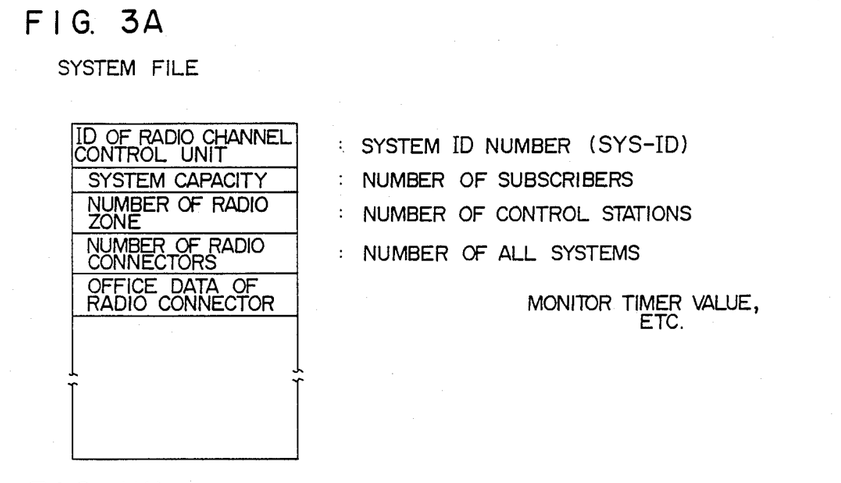
FIGS. 3A, 3B, 3C, 3D and 3E are diagrams for explaining the files of the radio channel control unit in FIGS. 1 and 2.

Numeral 115a designates, as shown in FIG. 3A, a system file for storing various data including the ID number of the radio channel control unit, that is, the ID number (SYS-ID) of the present system, the number n of radio zones, that is, the number of control stations for the radio connectors 12, the number of the radio connectors 12, station data for the radio connectors such as the monitor timer value, and further including, though not shown, such data as the program for the control section 120 of the radio connector 12 and various data to be stored in the radio channel connection file 125a and the station data file 125b.

Figure 3B:
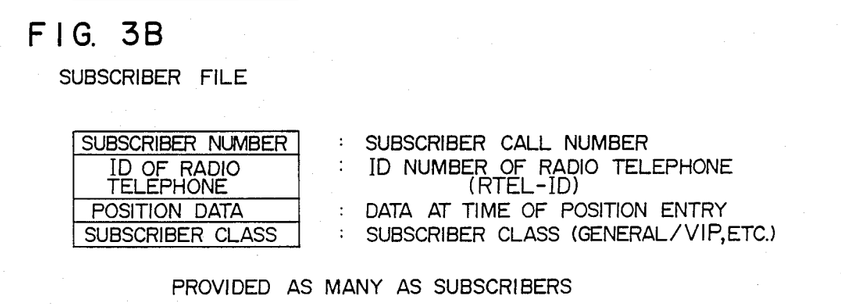

Numeral 115b designates, as shown in FIG. 3B, a subscriber file for storing call numbers (subscriber numbers) of the radio telephone sets 13, ID number (RTEL-ID), the position data such as the radio zone number of the current position and data on subscriber class. The position data is rewritten upon movement of the radio telephone 13 between radio zones as described below.

Figure 3C:
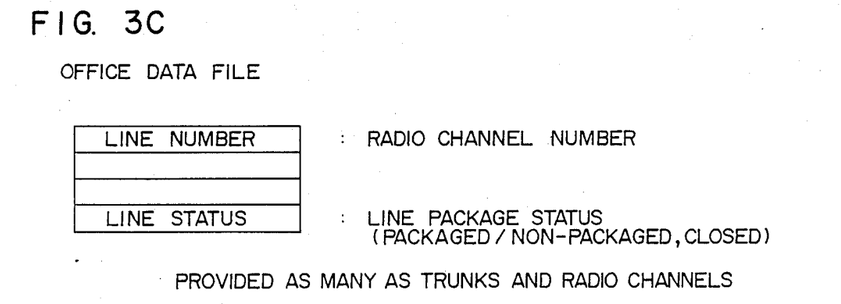

Numeral 115c designates, as shown in FIG. 3C, a station data file for storing the numbers of the trunk lines and radio channels, and other various data including the channel status indicating the present packaging condition of a given channel.

Figure 3D:
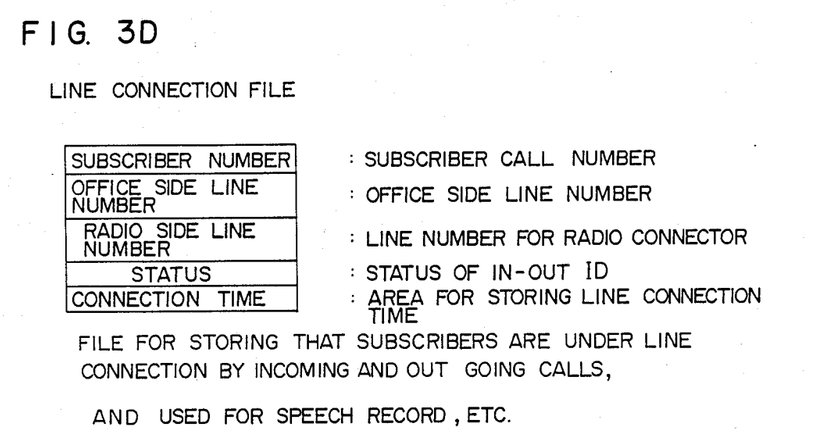
Figure 3E:
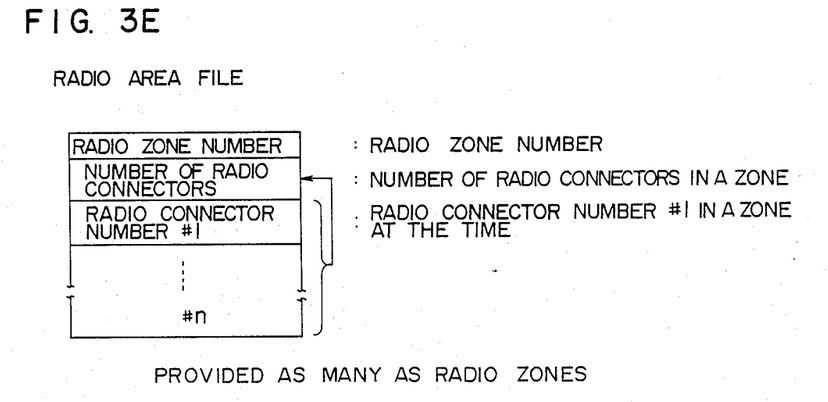

Numeral 115d designates, as shown in FIG. 3D, a line connection file for storing the call number (subscriber number) for the subscriber in speech, the line number of the trunk line, the line number with the radio connectors, the status of incoming/outgoing calls and line connection time. Numeral 115f designates, as shown in FIG. 3E, a radio area file for storing various data including the numbers of the radio zones, the number of the radio connectors installed in the radio zones, and the ID numbers of the radio connectors.

Numeral 116 designates a control console by which the operator enters various data in the files 115a to 115f or the monitor result on the radio connectors 12 making up control stations are displayed.

In each radio connector 12, numeral 120 designates a control section for controlling each radio connector 12 in whole. The control section 120 generally includes a microcomputer (CPU), a ROM (read-only memory) for storing an execution program for the CPU, and a RAM (random access memory) having a work area of the CPU, etc.

Numeral 121 designates a radio transceiver of multi-channel access (MCA) type for performing radio communication with the radio telephone 13, numeral 122 a line interface connected to the radio channel control unit 11 through a two-wire (2W) transmission path, numeral 123 a control signal transceiver for transmitting and receiving the control signal with the radio channel control unit 11, and numeral 124 a voice control section for turning on/off or amplifying the voice signal on the speech line.

Figure 4A:
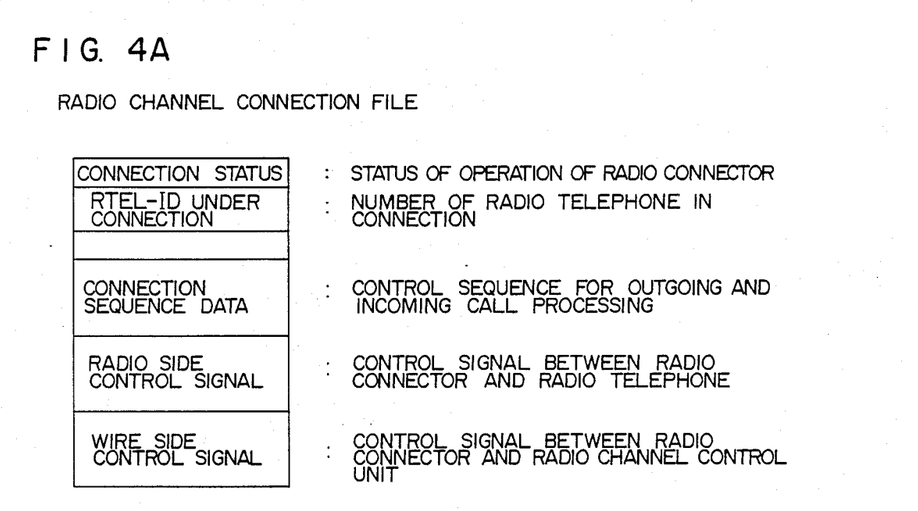
FIGS. 4A and 4B are diagrams for explaining the files of the radio connector of FIGS. 1 and 2.

Numeral 125a designates, as shown in FIG. 4A, a radio channel connection file for storing various data including the present operating condition of a particular radio connector 12, the ID number (RTEL-ID) of the radio telephone in connection, the control sequence for processing incoming/outgoing calls, various control signals for the radio telephone 13 (radio side) and various control signals for the radio channel control unit (wire side).

Figure 4B:
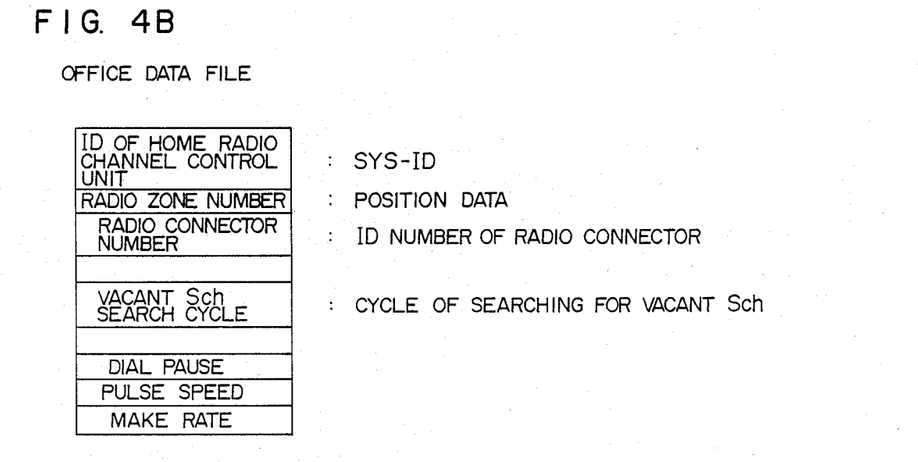

Numeral 125b designates, as shown in FIG. 4B, an office data file for storing various data including the ID numbers (SYS-ID) of the radio channel control unit 11, the number of the radio zone in which a particular radio connector is installed, the ID number of the particular radio connector, the dial pause time for line wire transmission or the like, the speed of the dial pulse (10 pps or 20 pps), the make ratio of the dial pulse (33%, 50% or 66%).

In each radio telephone set 13, numeral 130 designates a control section for controlling each radio telephone set 13 in whole. The control section 130 generally includes a micro-computer (CPU), a ROM (read-only memory) for storing an execution program for the CPU, and a RAM (random access memory) with a work area for the CPU or the like.

Numeral 131 designates a radio transceiver of multi-channel access (MCA) type for effecting radio communication with the radio connector 12, numeral 132 a transceiver for amplifying or turning on/off the voice signal of the receiver or microphone of the handset 132a and generating various tone signals (voice signals) corresponding to the call signals or the like sent out from the radio channel control unit 11 through the radio connector 12, numeral 133 a dial key for entering a dial number or the like, numeral 134 a hook switch turned on/off by the off-hook/on-hook state of the handset 132a, and numeral 136 a PB/DP change-over switch for selecting the type (PB or DP) of the dial signal for the existing exchange 10.

Figure 5A:
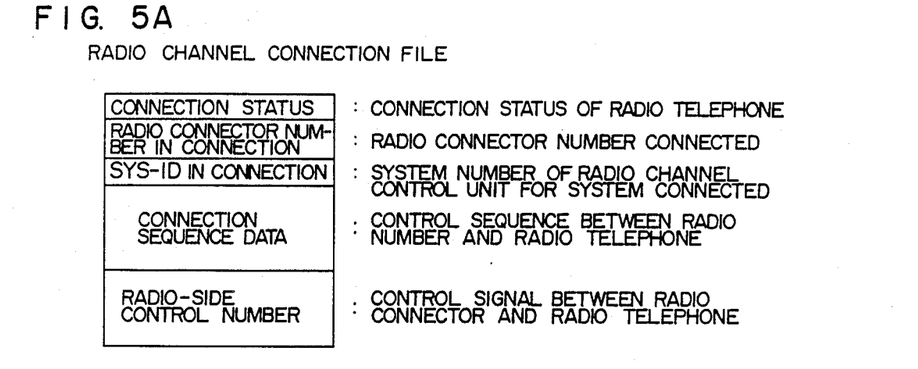
FIGS. 5A, 5B, 5C, 5D and 5E are diagrams for explaining the files of the radio telephone set shown in FIGS. 1 and 2.

Numeral 138a designates, as shown in FIG. 5A, a radio channel connection file for storing various data including the connections of a particular telephone set, the number of the radio connector 12 in connection, the system number (SYS-ID) of the radio channel control unit 11 in connection, the connection sequence with the radio connector 12 and the control signal for the radio connector 12.

Figure 5B:
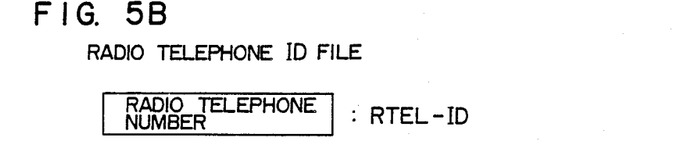
Figure 5C:
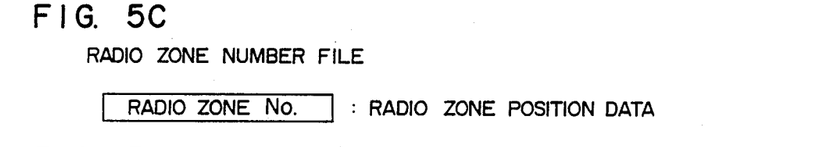
Figure 5D:
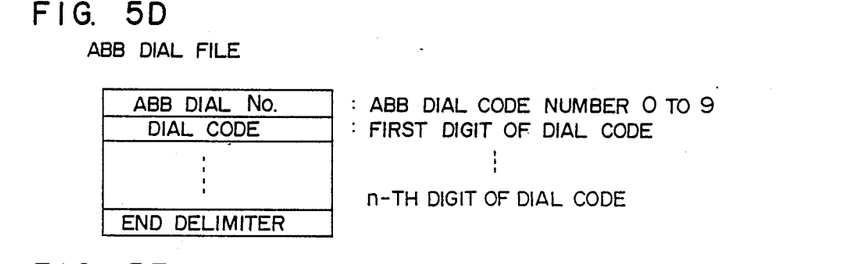
Figure 5E:
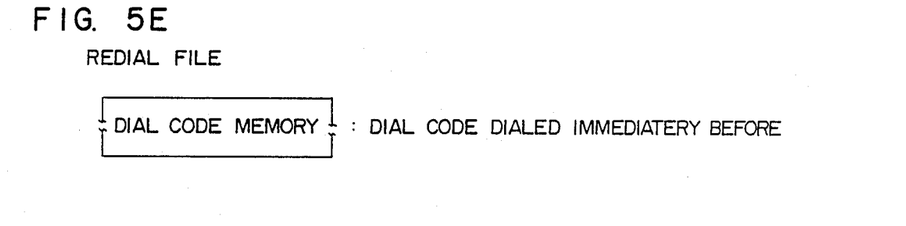

Numeral 138b designates, as shown in FIG. 5B, a radio telephone set ID file for storing the ID number (RTEL-ID) of a particular telephone set 13, numeral 138c a radio zone number file as shown in FIG. 5C for storing the number (position data) of the radio zone in which a particular radio telephone set 13 is located, numeral 138d an abbreviated dial file as shown in FIG. 5D for storing an abbreviated dial number with a corresponding dial code, and numeral 138e a redial file as shown in FIG. 5E for storing a dial code corresponding to the dial number entered through the dial key the previous time.

The members 130 to 138e described above are encased in a portable housing for the cordless telephone set, and a housing that can be installed on the center console or the like of an automobile for the automobile telephone set.

Now, the operation of the embodiment having the aforementioned configuration will be explained.

(1) Position entry from the radio telephone set 13

Figure 6:
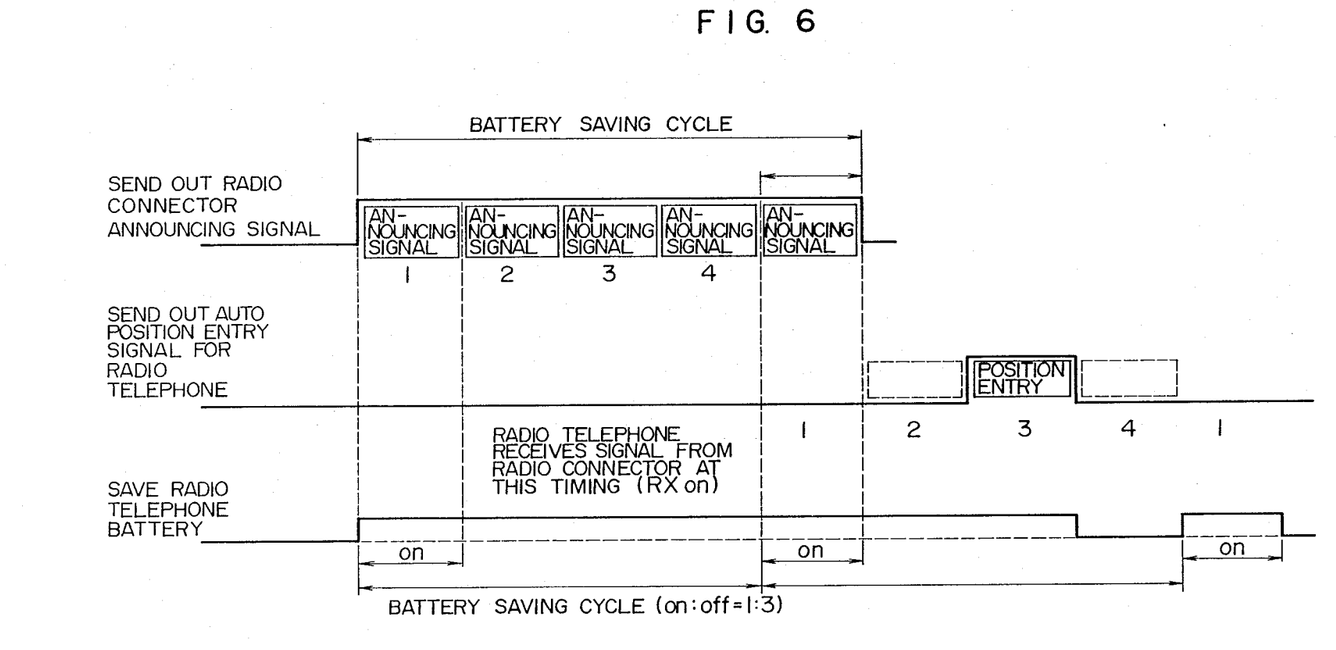
FIG. 6 is a timing chart for explaining the operation of the radio telephone system shown in FIGS. 1 and 2.
Figure 7:
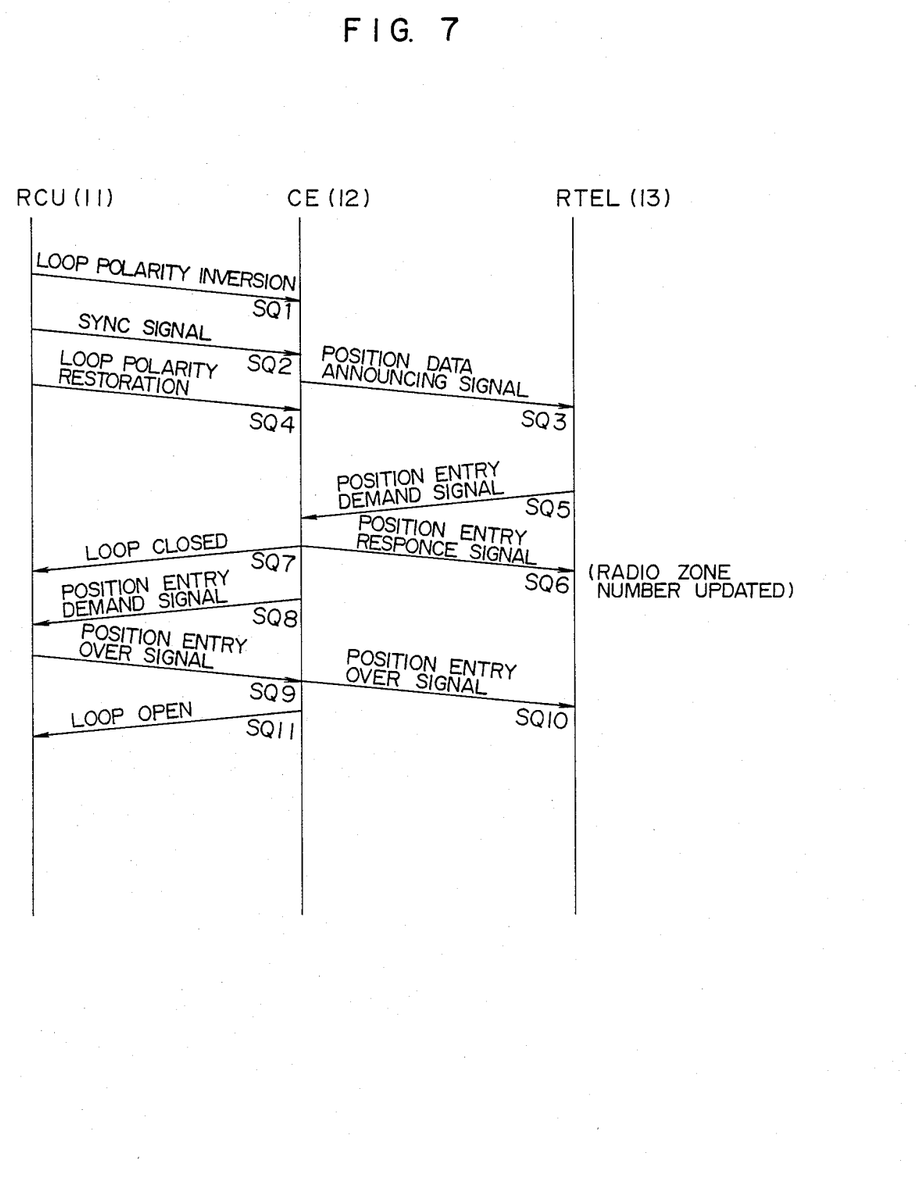
FIG. 7 is a diagram showing a control sequence for explaining the operation of the radio connector shown in FIGS. 1 and 2.

With reference to FIGS. 6 to 7, the operation of the radio telephone set 13 registering the radio zone in which a particular radio telephone set 13 is located will be explained.

First, as shown in FIG. 6, the control section 130 of the radio telephone set 13, except while busy, turns of/off the power supply in a battery-saving ratio of, say, 1 to 3, and while this power supply is off, is supplied with a minimum power (for counting the battery saving period, for example).

As shown in FIGS. 6 and 7, on the other hand, the radio channel control unit 11 inverts the polarity of the transmission line loop to invert the applied voltage for each radio connector 12 (control station) of each radio zone in a predetermined cycle (say, 5 minutes) (sequence (hereinafter referred to SQ) 1), sends out a sync signal (SQ2) and restores the polarity of the loop (SQ4).

The radio connector 12 making up the control station of each radio zone generates a position data announcing signal with the system ID number (SYS-ID) and the radio zone number in the office data file 125b following a preamble signal and a sync signal in response to the control sequence in the radio channel connection file 125a, the control signal and the sync signal, and sends out as a poling signal through the radio transceiver 121 (SQ3).

This announcement, as shown in FIG. 6 is repeatedly effected during a time period (+timeα) longer than the battery saving cycle of the radio telephone set 13. Specifically, the operation of SQ1 to SQ4 are repeated in five time slots in the case where the battery-saving cycles of the radio telephone 13 occurs in the ratio of 1 to 3 as shown in FIG. 6.

As a result, even when there is an error of the counting time of the battery saving cycle, each radio telephone set 13 is capable of receiving a position data announcing signal from the radio connector 12 while the power supply of its own is on. FIG. 6 shows the case where the position data announcing signal has begun to be received at time slot 1.

The control section 130 of each radio telephone set 13, when receiving the position data announcing signal including the signal of time α through the radio transceiver 131, resets a timer for the battery saving cycle so as to be able to provide for the receiving of the next position data announcing signal, and furthermore compares the radio zone number of the received position data announcing signal with the data in the radio zone number file 138c.

As one example of reset timing, it is possible to reset at a time when the radio zone number of the received position data announcing signal and the radio zone number stored in the radio zone number file 138c coincide with each other in the comparison of the two radio zone numbers.

In the case where these data coincide with each other, the power of the receiving circuit is turned on/off in the battery saving cycles. If these data fail to coincide with each other a predetermined number of times successively in the successive plural comparisons at times of receiving the position data announcing signal, on the other hand, the control section 130 generates a position entry demand signal including a preamble signal and a sync signal with the ID number of the radio telephone set and the received radio zone number in response to the control signal and the control sequence in the radio channel connection file 138a and transmits it through the radio transceiver 131 (SQ5).

This position entry demand signal is transmitted at random after receiving the position data announcing signal from the radio connector 12. The timing of transmitting the position entry demand signal is determined by random numbers, for example, or the ID number of an associated radio telephone set is divided by the number of time slots, and the remainder is used to determine the time slot in which transmission is effected. FIG. 6 shows the case of transmission in the third time slot.

The radio connector 12, upon receiving the position entry demand signal, transmits a position entry response signal to the radio telephone set 13 (SQ6), which rewrites the area of the radio zone number file 138c into the ID number of the radio zone received.

The radio connector 12 also closes the loop of the transmission path with the radio channel control unit 11 (SQ7), and generates and transmits a position entry demand signal to the radio channel control unit 11 (SQ8).

The radio channel control unit 11 rewrites the position data of the subscriber file 115b in response to the position entry demand signal and transmits a position entry over signal to the radio connector 12 (SQ9).

The radio connector 12 transmits the position entry over signal to the radio telephone set 13 (SQ10), while at the same time opening the loop with the radio channel control unit 11 (SQ11).

The radio telephone set 13, upon receiving the position entry over signal, turns on or off the power supply of the receiving circuit in the battery saving cycles.

The position entry demand signal which is supplied as a special signal from the radio connector 12 to the radio channel control unit 11 may be replaced by some means of notification by opening or closing a line loop. Also, instead of the position entry over signal from the radio channel control unit 11 to the radio connector 12 may be replaced by some means of polarity inversion of he line voltage or by sending a tone signal directly to the radio telephone set 13 or sending the tone signal as a code signal.

As will be understood from the foregoing description, according to the embodiment described above, the control section 130 of the radio telephone set 13 turns on and off the power supply of the receiving circuit thereof in battery saving cycles in the ratio of, say, 1 to 3 except when busy, and while the power supply is off, supplies only minimum power (such as for counting the battery saving time). Simply by these processes of operation, the position data of the radio telephone set 13 can be entered in the subscriber file 115b of the radio channel control unit 11.

(2) Incoming call to the radio telephone 13

Now, explanation will be made of an incoming call to the radio telephone set 13 through the radio channel control unit 11.

Assume that a call arrives at the extension 13X1 via the existing exchange 10. The existing exchange 10 accesses the control section 110 of the radio channel control unit 11 through the trunk interface 111 receiving the call.

The control section 110 reads out the radio zone associated with the radio telephone (13X1) from the subscriber file 115b, and sends out the ID number of the radio telephone set (13X1) and a call control signal to the control station of the radio connector 12 arranged in the particular radio zone. In the process, the control section 110 controls a matrix switch 114 thereby to connect the radio channel interface corresponding to the control station of the radio connector 12 for the particular radio zone with the trunk interface 111 associated with the incoming call.

The control section 120 of the radio connector 12, upon receiving the call signal and the like through the line interface 122 and the control signal transceiver 123, generates the call control signal and the ID number for the radio telephone set (13X1) for radio communication on the basis of the control signal data of the radio channel connection file 125a, transmits these signals repeatedly for a time period ($+\alpha$) longer than the battery saving cycle of the radio telephone set 13 like the pattern shown as a calling signal in FIG. 6.

The control section 130 of the radio telephone set 13, as explained with reference to FIG. 6, turns on/off the power supply of the receiving circuit in predetermined battery-saving cycles, and when the power supply is on, receives a call control signal and a signal representing the ID number of the radio telephone set (13X1) thereby to keep the power on. Then, the ID number received is compared with the ID number in the radio telephone set ID file 138b, so that the control section 130 of the radio telephone set (13X1) for which the ID numbers coincide with each other turns on the transceiving section 132 thereof. The transceiving section 132 thus generates a voice signal for calling in response to a control signal from the radio connector 12.

In this way, calling signals from the existing exchange 10 are transmitted in sequentially different signal formats to the radio telephone set (13X1) through the radio channel control unit 11 and the control section of the radio connector 12.

With the off-hook of the radio telephone (13X1), the particular data is sent out to the control station of the radio connector 12 and the radio channel control unit 11, so that the control section 120 of the radio connector 11 establishes a communication path with the calling telephone set and the radio telephone set (13X1) by turning on the voice control section 124.

Upon termination of speech, the control section 130 of the radio telephone set 13 turns on the power supply and restarts the battery saving cycles.

(3) Transmission from radio telephone set 13

Now, the operation of transmission from the radio telephone set 13 to the trunk line or other radio telephone sets 13 will be explained.

With the off-hook of the radio telephone set 13 to turn on the hook switch 134, the power supply is turned on, and the associated control section 130 generates a calling signal in response to the connection sequence and the control signal in the radio channel connection file 135 and together with the ID number of the present radio zone in the radio zone number file 138c, sends out the calling signal to the radio connector 12.

The control section 120 of the control station of the radio connector in each radio zone compares the ID number thus received with the ID number of its own radio zone in the office data file, and if they coincide with each other, transmits a call response signal and a signal designating a speech channel to the radio telephone set 13, with the result that the particular radio connector 12 acts as a busy station.

Upon transmission of a channel switching signal from the control section 130 of the radio telephone set 13, the radio connector 12 closes the loop with the radio channel control unit 11. Also, when the control section 130 of the radio telephone set 13 produces an interference detection over signal in the absence of interference with an adjacent radio zone, the radio connector 12 transmits a calling signal to the radio channel control unit 11. The radio channel control unit 11, in turn, closes the loop of the subscriber line on the existing exchange side upon receiving the calling signal, and notifies the call to the existing exchange 10.

In the next moment, the control section 110 of the radio channel control unit 11 transmits a call response signal to the particular radio connector 12, and with the turning on of the voice control section 124, transmits a voice circuit start signal to the radio telephone set 13. The control section 130 of the radio telephone set 13 turns on the transceiving section 132 in response to the voice circuit start signal.

As a result, the dial tone transmitted from the existing exchange 10 to the radio telephone set 13 through the above-mentioned closed loop is reproduced into a voice by the receiver of the handset 132a, thereby enabling the calling party to acknowledge the closed loop with the existing exchange 10.

The control section 130 of the radio telephone set 13, upon application thereto of a dial number from the dial key 113, converts it into a dial code, and together with a signal representing the dial signal system set by the PB/DP change-over switch 136 (such as "0" for PB signal and "1" for DP signal), transmits it to the radio connector 12.

The radio connector 12, in response to the signal representing the dial signal system, converts the dial code into a dial signal of DP or PB signal system, and transmits it to the existing exchange 10 through the above-mentioned closed loop. The existing exchange 10 sends out a ring-back tone to the radio connector 12 through the same closed-loop, and the radio connector 12 converts the ring-back tone into the particular radio signal, which is transmitted to the radio telephone set 13, thus leading to the busy station by response from the called telephone set.

Upon termination of speech, the control section 130 of the radio telephone set 13 turns off the power supply and restarts the battery saving cycles.

It will thus be understood from the foregoing description that according to the present invention, the position of a radio telephone set can be registered automatically without keeping on the power supply of the radio telephone set, and therefore the power consumption of the radio telephone set is reduced, while at the same time securing synchronization with the radio telephone sets in the radio zone associated with a radio connector.

We claim:

1. A radio telephone system including a plurality of radio telephone sets, a plurality of radio connectors and a radio channel control unit connected a telephone exchange used for general subscribers the radio telephone system comprising:

each of the ratio telephone sets including first memory means for storing an ID number of the radio telephone set, second memory means for storing an ID number of a radio zone in which the radio telephone set is presently located, and control means for turning on/off a power supply of a receiving circuit in first predetermined cycles;

each of the radio connectors being arranged in one of a plurality of radio zones and including means for transmitting the ID number of the radio zone to the radio telephone set in second predetermined cycles longer than the first predetermined cycle;

the radio channel control unit including a third memory means for storing the ID number of each of the radio telephone sets and the ID number of each of the radio zones in which each of the radio telephone sets is located by means of setting the correspondence of the two ID numbers;

wherein the radio telephone set compares the ID number of the radio zone provided by the radio connector with the ID number of the radio zone stored in the second memory means when receiving the provided ID number, and transmits both of the ID number of the radio telephone set stored in the first memory means and the received ID number of the radio zone to the radio connector as a position entry signal when the two compared ID numbers fail to coincide with each other, and after that the radio connector receiving the ID numbers of the radio telephone set stored in the first memory means and the radio zone sends the two received ID numbers to the radio channel control unit, and furthermore the radio channel control unit stores the ID number of the radio telephone set and that of the radio zone in the third memory.

2. A radio telephone system according to claim 1, wherein the transmission of the position entry signal from the radio telephone set to the radio connector is performed in a timing generated on the basis of the ID number of the radio telephone set.

3. A radio telephone system according to claim 1, wherein when the two ID numbers fail to coincide with each other a predetermined number of times successively in the plural comparisons as to the two ID numbers, the radio telephone set transmits the position entry signal to the radio connector.

4. A radio telephone system including a plurality of radio telephone sets, a plurality of a radio connectors and a radio channel control unit connected a telephone exchange used for general subscribers the radio telephone system comprising:

each of the radio telephone sets including first memory means for storing an ID number of the radio telephone set, second memory means for storing an ID number of a radio zone in which the radio telephone set is presently located, and control means for turning on/off a power supply of a receiving circuit in first predetermined cycles generated by a built-in timer;

each of the radio connectors arranged in one of radio zones and including means for transmitting the ID number of the radio zone to the radio telephone sets in second predetermined cycles longer than the first predetermined cycle;

the radio channel control unit including a third memory means for storing the ID number of each of the radio telephone sets and the ID number of each of the radio zones in which each of the radio telephone sets is located by means of setting the correspondence of the two ID numbers;

wherein the radio telephone set resets the timer for generating the first predetermined cycles and compares the ID number of the radio zone provided by the radio connector with the ID number of the radio zone stored in the second memory means when receiving the provided ID number, and transmits both of the ID number of the radio telephone set stored in the first memory means and the received ID number of the radio zone to the radio connector as a position entry signal when the two compared ID numbers fail to coincide with each other, and after that the radio connector receiving the ID numbers of the radio telephone set stored in the first memory means and the radio zone sends the two received ID numbers to the radio channel control unit, and furthermore the radio channel control unit stores the ID number of the radio telephone set and that of the radio zone in the third memory.

5. A radio telephone system according to claim 4, wherein the transmission of the position entry signal from the radio telephone set to the radio connector is performed in a timing generated on the basis of the ID number of the radio telephone set.

6. A radio telephone system according to claim 4, wherein when the two ID numbers fail to coincide with each other a predetermined number of times successively in the plural comparisons as to the two ID numbers, the radio telephone set transmits the position entry signal to the radio connector.

7. A radio telephone system according to claim 4, wherein the radio telephone set resets the timer at a time when, after receiving the ID number of the radio zone provided by the radio connector, comparing the provided ID number with the ID number of the radio zone stored in the second memory means and the compared two ID numbers coincide with each other.

* * * * *